(12) United States Patent
Guitarte

(10) Patent No.: US 10,896,396 B1
(45) Date of Patent: Jan. 19, 2021

(54) COGNITIVE AND HEURISTICS-BASED EMERGENT FINANCIAL MANAGEMENT

(71) Applicant: Wells Fargo Bank, N.A., San Francisco, CA (US)

(72) Inventor: Andrew Guitarte, Pittsburgh, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 670 days.

(21) Appl. No.: 15/787,209

(22) Filed: Oct. 18, 2017

Related U.S. Application Data

(60) Provisional application No. 62/409,643, filed on Oct. 18, 2016.

(51) Int. Cl.
*G06F 16/30* (2019.01)
*G06Q 10/06* (2012.01)
*G06N 20/00* (2019.01)

(52) U.S. Cl.
CPC .......... *G06Q 10/067* (2013.01); *G06N 20/00* (2019.01)

(58) Field of Classification Search
CPC ..................................................... G06Q 30/00
See application file for complete search history.

(56) References Cited

U.S. PATENT DOCUMENTS

| 7,885,902 | B1* | 2/2011 | Shoemaker | G06Q 10/10 705/319 |
| 10,521,856 | B1* | 12/2019 | Joseph | G06Q 10/02 |
| 2007/0226099 | A1* | 9/2007 | Senturk-Doganaksoy | G06Q 40/00 705/35 |
| 2009/0198602 | A1* | 8/2009 | Wang | G06Q 30/02 705/35 |
| 2009/0276368 | A1* | 11/2009 | Martin | G06Q 40/02 705/36 R |
| 2010/0131891 | A1* | 5/2010 | Firminger | G06Q 10/10 715/810 |
| 2010/0161400 | A1* | 6/2010 | Snodgrass | G06Q 30/02 705/14.16 |
| 2010/0223212 | A1* | 9/2010 | Manolescu | G09B 7/00 706/12 |
| 2018/0114142 | A1* | 4/2018 | Mueller | G06N 20/00 |
| 2018/0144047 | A1* | 5/2018 | Beller | G06F 16/3329 |

OTHER PUBLICATIONS

Andrew Guitarte. "Business Capability Architecture Is the Tie that Binds All," Cutter IT Journal, The Journal of Information Technology Management, Dec. 2012, pp. 24-31, vol. 25, No. 12.
Ruth Malan, et al. "Enterprise Architecture as Business Capabilities Architecture," Bredemeyer Consulting, May 2003, updated May 2006, retrieved from: http://www.bredemeyer.com/papers.htm.

* cited by examiner

*Primary Examiner* — Mahesh H Dwivedi
(74) *Attorney, Agent, or Firm* — Walter | Haverfield LLP; James J. Pingor

(57) ABSTRACT

Cognitive and heuristics-based emergent financial management is provided. A method includes obtaining data related to an individual, an organization, a process, or combinations thereof. The data is obtained from internal sources, external sources, or combinations thereof. The method also includes creating data sets from the data based on determined classifications of the data. Further, the method includes establishing relationships between the data sets and determining a conclusion based on the relationships. The conclusion is based on a hypothesis that has undergone a test process.

19 Claims, 10 Drawing Sheets

COGNITIVE AND HEURISTICS-BASED EMERGENT FINANCIAL MANAGEMENT

CROSS-REFERENCE TO RELATED APPLICATIONS

This application claims the benefit of U.S. Provisional Patent Application Ser. No. 62/409,643, entitled "COGNITIVE AND HEURISTICS-BASED EMERGENT FINANCIAL MANAGEMENT" filed on Oct. 18, 2016. The entirety of the above-noted application is incorporated by reference herein.

BACKGROUND

The term "big data" has been used to describe sets of data that are of such a very large size and/or complexity that traditional data processing applications are not capable of adequately handing the sets of data. Further, the term also refers to the use of data for various types of analytics, including user behavior analytics, predictive analytics, or other advanced forms of data analytics that are designed to extract value from the data. Since data is captured by many devices and in many forms (e.g., computing devices, cameras, microphones, radio-frequency identification readers, and other forms of computing devices and/or data capturing devices), there is an ever growing amount of data that is being gathered by a multitude of sources (e.g., individuals, businesses, corporations, governments, and so on).

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to cognitive and heuristics-based emergent financial management. An aspect relates to a system that includes a processor and a memory that stores executable instructions that, when executed by the processor, facilitate performance of operations. The operations include obtaining data related to an individual, an organization, a process, or combinations thereof. The operations also include creating data sets from the data based on determined classifications of the data. Further, the operations include establishing relationships between the data sets and determining a conclusion based on the relationships. The conclusion may be based on a hypothesis that has undergone a test process.

In an example, the data may be in a structured format, a semi-structured format, an unstructured format, or combinations thereof. In another example, the data may be acquired from an internal source. In an additional or alternative example, the data may be acquired from an external source.

Another aspect relates to a method that includes obtaining, by a system comprising a processor, data from internal sources, external sources, or combinations thereof. The method also includes creating, by the system, data sets from the data based on determined classifications of the data. Further, the method includes establishing, by the system, relationships between the data sets. The method also includes determining, by the system, a recommendation based on the relationships.

In an example, the determining comprises performing a test process on a hypothesis. In an alternative or additional example, the determining is based in part on a feedback loop that represents previous recommendations (e.g., was the recommendation accurate, inaccurate, and so forth).

A further aspect relates to a computer-readable storage device that stores executable instructions that, in response to execution, cause a system comprising a processor to perform operations. The operations include obtaining data related to an individual, an organization, a process, or combinations thereof. The operations also include creating data sets from the data based on determined classifications of the data. Further, the operations include establishing relationships between the data sets and determining a conclusion based on the relationships. The conclusion may be based on a hypothesis that has undergone a test process.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

Figure 1:
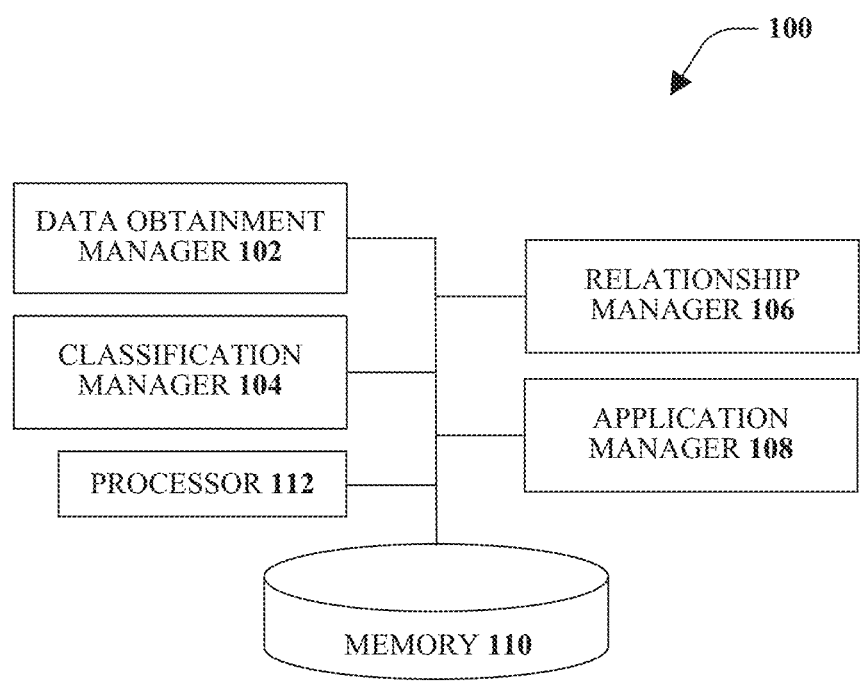
FIG. 1 illustrates an example, non-limiting system configured to provide cognitive and heuristics-based emergent financial management, according to an aspect.

Appendix A is a document describing various embodiments and features associated with particular aspects of the various aspects—this appendix is to be considered part of the specification; and Appendix B is a document describing various aspects and features associated with particular embodiments—this appendix is to be considered part of the specification.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to cognitive and heuristics-based emergent financial management. The various aspects are configured to provide a classification scheme or taxonomy that organizes the terabytes of data (e.g., big data), regardless of the form of the data (e.g., semi-structure, structured, unstructured, and so on). The various aspects may be configured to organize the data by identifying the components or the buckets into which the data is classified. Further, the various aspects may be configured to establish relationships between the data or sets of data in order to create useful associations. Based on the organization, identification, and relationships, conclusions and hypothesis may be develop, which may be tested or experimented with in order to prove a certain hypothesis.

It is noted that although the various aspects are discussed herein with respect to financial management, the disclosed aspects are not limited to this implementation. Instead, the aspects may be applied to other technologies (e.g., cognitive healthcare, insurance, and so on) and financial management is utilized as a common theme to assist in describing the various aspects disclosed herein.

As one example, a customer of a financial entity, such as a bank, may want to use the bank to not only deposit and save money, but also for the bank to help her create wealth. However, for a simple question such as "Should I buy or rent a house?" it may take a week or more for the customer to set up an appointment that is convenient for both the customer and a financial advisor at the bank. For a more holistic question related to building wealth, the customer may be willing to work with a financial advisor. However, the customer may find the amount of information that needs to be collected is cumbersome to gather. Further, the financial advisor may find that reviewing such a large amount of data is not practicable and the data that is able to be processed might not be adequate to fully answer the question.

For example, in terms of the future, it might not be know which are the correct channels (e.g., sources of data), or which channels are currently available, to answer the question. Further, the quality of the information available may also be a concern. For example, if the customer's question is related to whether she should buy or rent a house, she might not be looking for just basic answers. Instead, she may want the bank to know everything and anything related to who she is as a customer and as an individual. The information available may include what she does on a daily basis, where she is in terms of location, what are the other things she needs to be aware of in terms of macroeconomic factors, what are the interest rates, what are her peers doing in terms of buying or renting in the same neighborhood that is of interest, and so on.

Based on all the information collected about the customer over time, a personal management strategy may be developed for the customer, according to various aspects. Thus, information from various sources is collected, cleaned up as necessary, organized, and analyzed so that insightful suggestions may be provided. The bank is able to tell the customer that, based on what is known about the customer going back x number of years, and based on where the financial market is headed (as well as the bank), various suggestions may be provided. Continuing the above example, information related to what is known about the customer for the last x number of years, what her peers are doing, where the bank is headed, and other macroeconomic factors may be analyzed. Based on this analysis, the bank may suggest that the customer wait at least forty days for the market to settle, then it will be a good time to revisit the decision on whether to buy or rent.

FIG. 1 illustrates an example, non-limiting system 100 configured to provide cognitive and heuristics-based emergent financial management, according to an aspect. The system 100 includes a data obtainment manager 102 that may be configured to obtain data related to an individual and/or a set of individuals. For example, the individual may be a customer of a bank and a set of individuals may be family members (e.g., the customer, the customer's spouse, and the customer's child). In an alternative or additional example, the set of individuals may be individuals that are associated with each other, but are not family members (e.g., friends, associated, co-workers, related credit card holders (e.g., employed at the same company), and so on). In still another alternative or additional example, the set of individuals may be of a similar age, geographic location, or other demographic information.

The data obtainment manager 102 may also be configured to obtain data related to an organization and/or a process. The organization may be any type of organization and the processes may be processes within the organization. Further, the data may be related to previous recommendations and whether the recommendations were accurate (e.g., through a feedback loop).

According to some implementations, the data obtainment manager 102 may be configured to gather the information from internal sources and/or external sources. Internal sources may be sources within an organization, such as a financial entity for example. External sources may be sources that are related to a user, such as a user device, a Global Positioning System (GPS) device, or other devices related to the user, other users or peers, and/or other entities (e.g., retail store, and so on).

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Also included in the system 100 may be a classification manager 104 that may be configured to create data sets from the data acquired by the obtainment manager 102. The data may be in any format including structured data, semi-structured data, unstructured data, and so on. To create data sets, the classification manager 104 may be configured to identify categorizations and/or buckets into which the particular data being reviewed should be classified.

A relationship manager 106 may be configured to establish relationships between two or more sets of data. The relationships identify useful associations between data contained in respective data sets. For example, a first set of data may be related to a second set of data; a third set of data may be related to a fourth set of data; and a fifth set of data may not be related to any other current data sets (e.g., is a standalone set of data).

The system 100 may also include an application manager 108 that may be configured to determine one or more conclusions based on the relationships. The one or more conclusions may be unique for a particular customer or user, or may be generic for a set of users. The application manager 108 may be configured to develop the one or more conclusions based on one or more hypotheses that have undergone experimentation or other testing (e.g., a test process).

Further, the system 100 may include at least one memory 110 that may store computer executable components and/or computer executable instructions. The system 100 may also include at least one processor 112, communicatively coupled to the at least one memory 110. The at least one processor 112 may facilitate execution of the computer executable components and/or the computer executable instructions stored in the at least one memory 110. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 110 (e.g., operatively connected to the at least one memory 110), the various aspects are not limited to this implementation. Instead, in accordance with various implementations, the one or more computer executable components and/or the one or more computer executable instructions may be stored in (or integrated within) the at least one memory 110. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Figure 2:
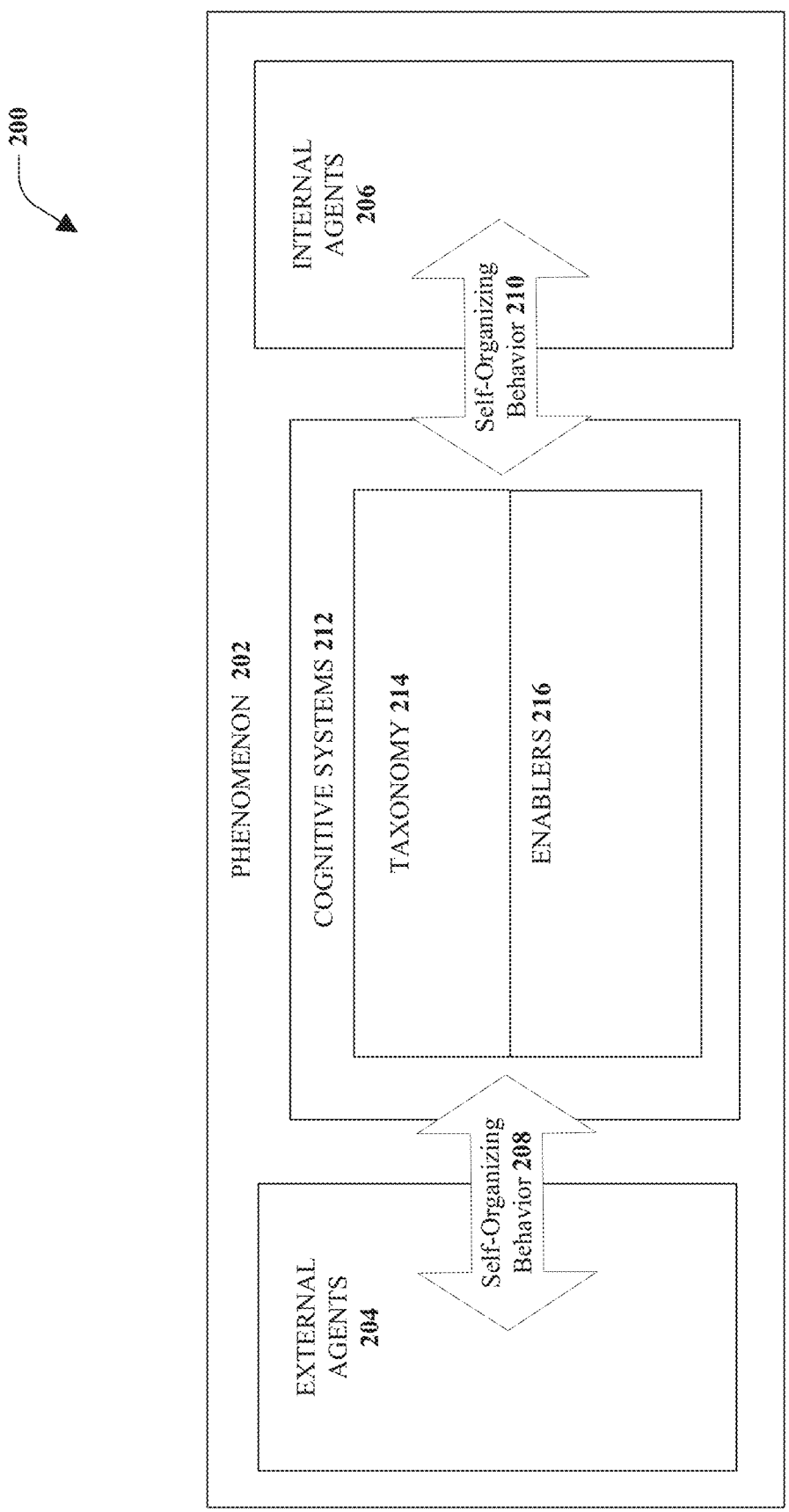
FIG. 2 illustrates an example, non-limiting generic schematic representation of a capacity architecture, according to an aspect.

FIG. 2 illustrates an example, non-limiting generic schematic representation of a capacity architecture 200, according to an aspect. With the increase in the amount of data that is available and collected from various sources, the data should be organized in a manner that allows the data to be easily found and utilized on an as needed basis.

The architecture 200 illustrated is generic in order to describe various aspects. The overall architecture 200 relates to a phenomenon 202, which is the subject matter under investigation (e.g., financial management, cognitive healthcare, and so on). The subject matter or phenomenon 202 may include almost anything and some examples include financial management, cognitive healthcare, insurance, and so on.

A concept related to the various aspects discussed herein is complexity theory. In its simplest terms, complexity theory states that something is complex because something emerges (e.g., the term emerging) that is unexpected from a set of actions and reactions by certain agents. For example, there may be a group of agents that respond to something in the environment and that react without any central controller (e.g., each agent acts independently). The agents are illustrated as external agents 204 and internal agents 206. The external agents 204 are agents that are not under the direction or control of a central source (e.g., an employer). Examples of external agents include customers, individuals, and so on. The internal agents 206 are agents that are directed or controlled by a central source (e.g., an employer). As utilized herein an agent, a user, a client, a customer, an entity, or the like, may refer to a human, an actor, a computer, the Internet, a system (or another system), a commercial enterprise, a computer, a machine, machinery, and so forth, hereinafter referred to as an agent, a user, a customer, and/or an entity, depending on the context.

As one example, the internal agents 206 of a financial entity may be lines of business and individuals within the line of business act without anyone controlling them or without regard to the effect on other lines of business. For example, someone from outside the bank causes individuals within the bank to determine they must act immediately. This is when irrational behavior may occur. The framework of the various aspects discussed herein address those emerging behaviors. Thus, the various aspects not only predict future actions, but also prescribe how people should act. Accordingly, the various aspects provide at least three levels of analytics, namely, descriptive, predictive, and prescriptive analytics.

With continuing reference to FIG. 2, the way complexity theory is explained is that there are a set of agents (e.g., external agents 204 and internal agents 206) that have a mind of their own—each agent may send and respond. The external agents 204 have self-organizing behavior 208 and the internal agents 206 have self-organizing behavior 210. According to some implementations, the external agents 204 and/or the internal agents 206 may take stimulus from the cognitive systems 212 they interface with (in this example, the bank).

The self-organizing behavior 208 and/or the self-organizing behavior 210 represent two-way self-organizing behavior. The cognitive systems 212 (e.g., the bank) adapts to what the external agents 204 and/or the internal agents 206 are doing. Further, the agents 204, 206 adapt to what the cognitive systems 212 are doing. For example, the bank takes into consideration the internal systems and/or procedures implemented within the bank. Further, the bank takes into consideration what is happening in the outside world (e.g., outside influences not controlled by the bank).

As illustrated, within the cognitive systems 212 are two generic portions, a taxonomy 214 and enablers 216. The taxonomy 214 may be any type, provided it allows the knowledge to be organized. In one example, the taxonomy 214 may be a business architecture that relates to rules and/or policies established by the business. The enablers 216 are the smart computing, data visualization, and other concepts and technologies.

In one implementation, the phenomenon 202 may be financial management. However, the disclosed aspects are not limited to this implementation. Instead, the phenomenon may be other aspects of banking, insurance, and so on. It is noted that the term "financial management" may be applicable to both a consumer as well as an organization. Financial management from an individual perspective may be financial life management (e.g., how to create wealth, what kind of financial decisions do I make that will help me optimize what I have today, and so on). The concept of financial management may expanded to the external agents 204 (e.g., consumers) and internal agents 206 (e.g., employees, shareholders, business partners, and so forth). For example, the internal agents 206 may also ask questions related to what kind of financial decisions should be made today that will optimize resources for the future.

Figure 3:
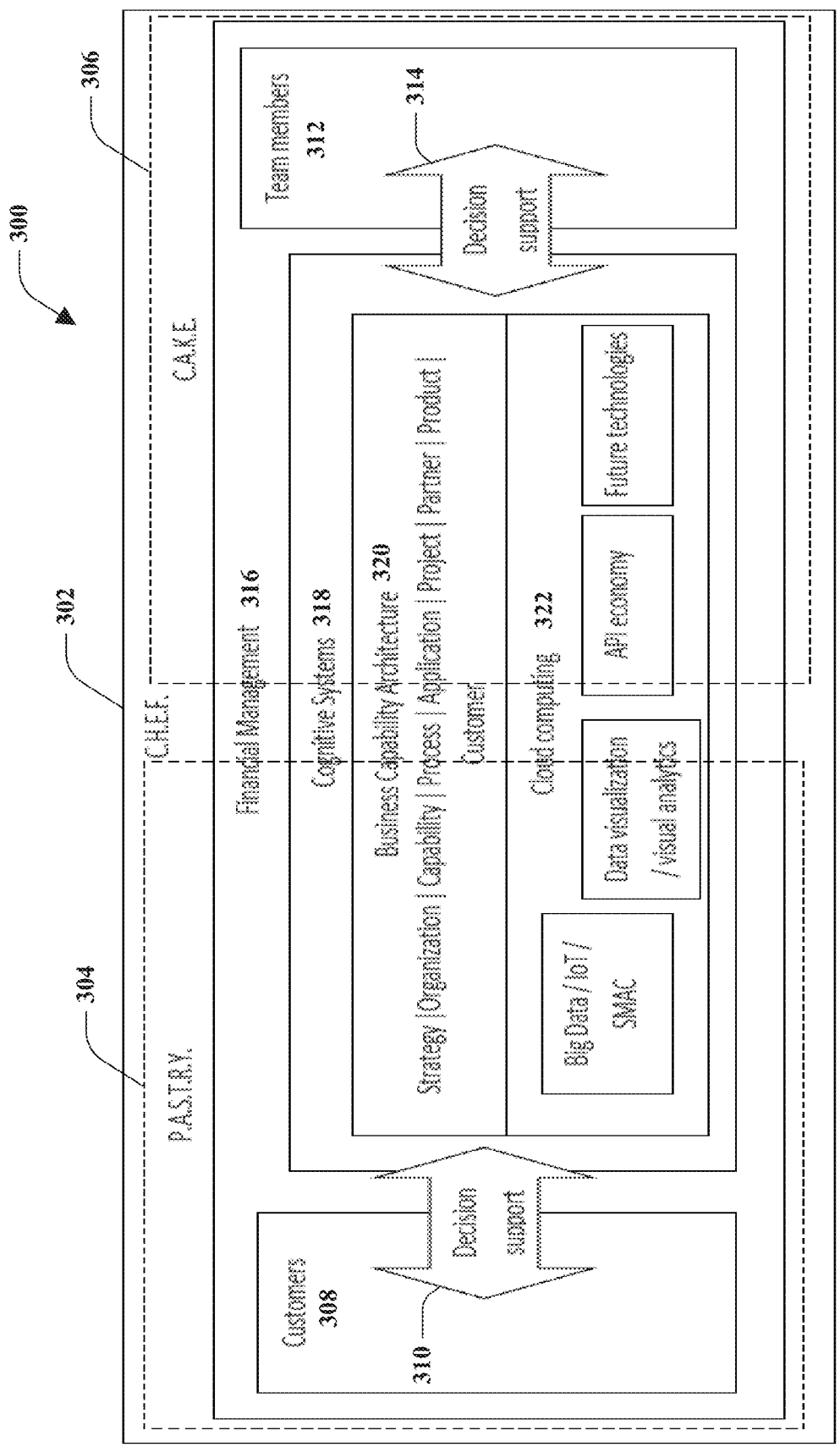
FIG. 3 illustrates an example schematic representation of a capacity architecture, according to an aspect.

FIG. 3 illustrates an example schematic representation of a capacity architecture 300, according to an aspect. The capacity architecture 300 of FIG. 3 is a specific implementation of the capacity architecture 200 of FIG. 2.

As illustrated, the capacity architecture 300 may be divided into three main sections. A first section is a Cognitive and Heuristic Based Emerging Financial Management (CHEF) section 302. The CHEF section 302 may be configured to capture the benefits of various technologies including, for example, SMAC (social, mobile, analytics, and cloud), big data, and so on. A second section is a Personal Asset Tracking (PASTRY) section 304. A third section is a Capability Architecture Knowledge Base for an Enterprise (CAKE) section 306. Further details related to these sections will be provided below.

In the specific implementation of the capacity architecture 300, the external agents are customers 308 that are requesting decision support 310. Further, the internal agents are team members 312 that are requesting decision support 314. The decision support 310, 314 (e.g., self-organizing behavior) in this example may be similar—the customers 308 and team members 312 need help in making certain decisions related to financial management 316 (e.g., the phenomenon 202 of FIG. 2).

Figure 4A:
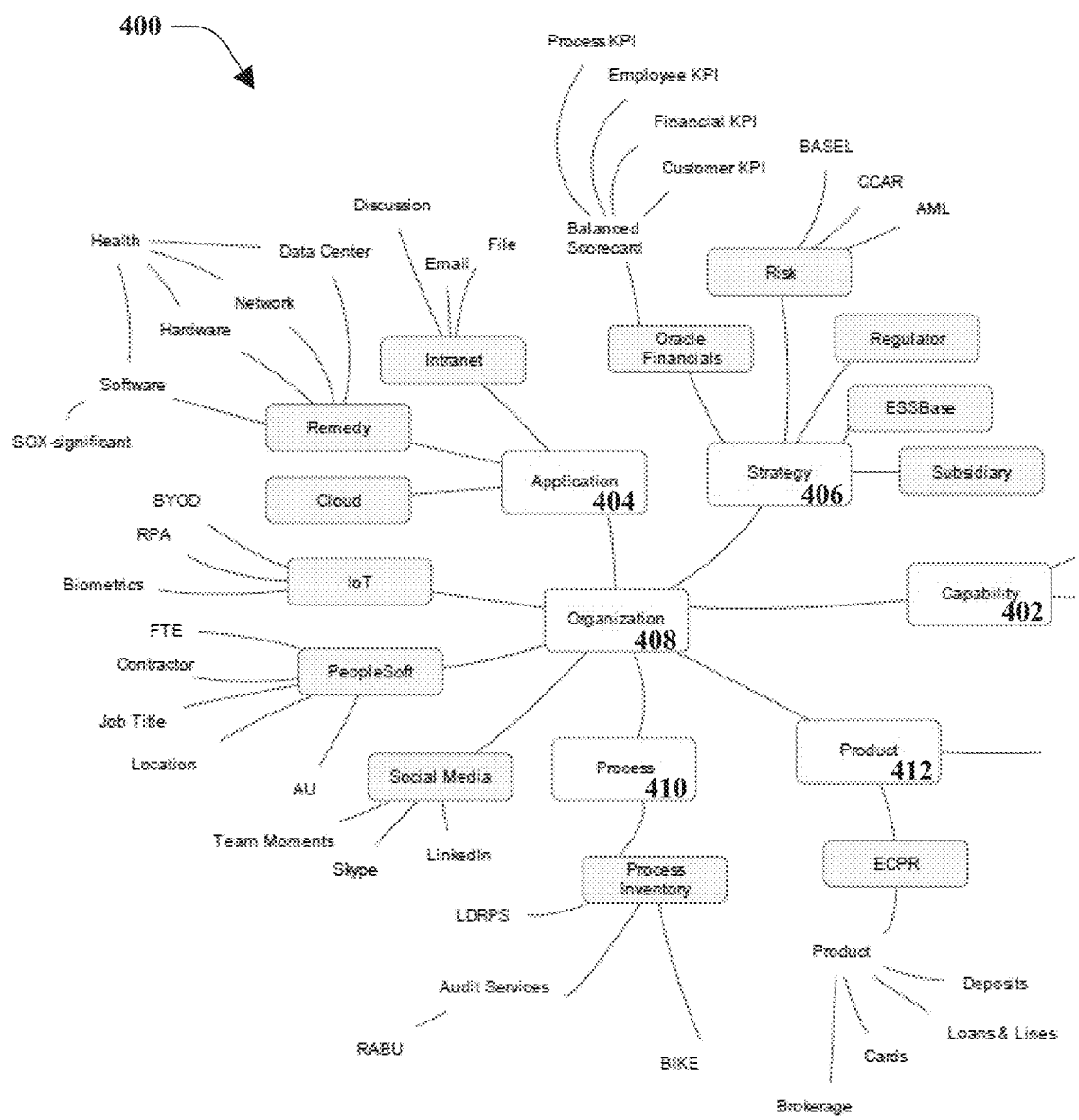
FIG. 4A illustrates a left hand side of an example, non-limiting Capability Architecture Knowledge Base for an Enterprise data map.
Figure 4B:
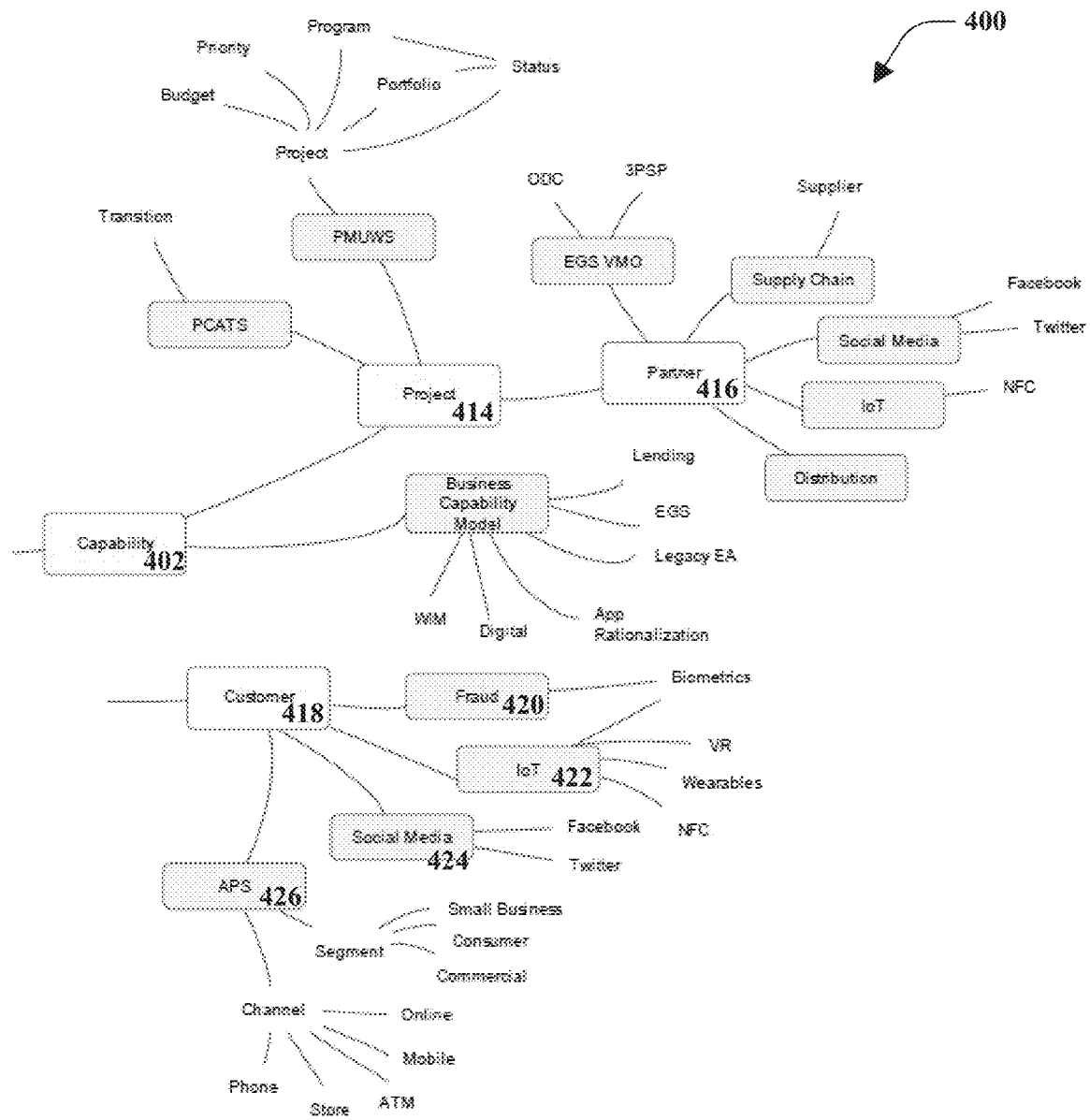
FIG. 4B illustrates a right hand side of the Capability Architecture Knowledge Base for an Enterprise data map.

The cognitive systems 318 include a business capacity architecture 320 and cloud computing 322. The cloud computing 322 may include, for example, big data, internet of things (IoT), SMAC, data visualization, visual analytics, application programming interface (API) economy, and other technologies. The business capacity architecture 320 includes various components such as strategy, organization, capability, process, application, project, partner, product, customer, and so on. Further information related to the interrelationships within the business capacity architecture 320 for this example is illustrated in FIGS. 4A and 4B. FIG. 4A illustrates a left hand side of an example, non-limiting CAKE data map 400 and FIG. 4B illustrates a right hand side of the CAKE data map 400. The box labeled capacity 402 is a central point on both view of the CAKE data map 400.

Components of the business capacity architecture 320, include, for example, capability 402, application 404, strategy 406, organization 408, process, 410, product, 412, project 414, partner 416, and customer 418. The other blocks within FIGS. 4A and 4B represent the system of record. For example, the systems of record for customer 418, include fraud 420, internet of things (IoT) 422, social media 424, and APS 426. The system of record for the other business capacity architecture components are not labeled for purposes of simplicity. Each source of record may be further divided into specific sources, as illustrated.

The CAKE data map 400 represents the concept that, if you have big data in a particular box, where is the big data located, what systems are in place, and so on. For example, if looking at customer profile information, fraud analytic information may be analyzed to determine if the customer is logged in using a smart phone, an online session, and so on. Further information is discussed in Appendix A and Appendix B. Appendix A is a document describing various embodiments and features associated with particular aspects of the various aspects—this appendix is to be considered part of the specification. Appendix B is a document describing various aspects and features associated with particular embodiments—this appendix is to be considered part of the specification.

Figure 5:
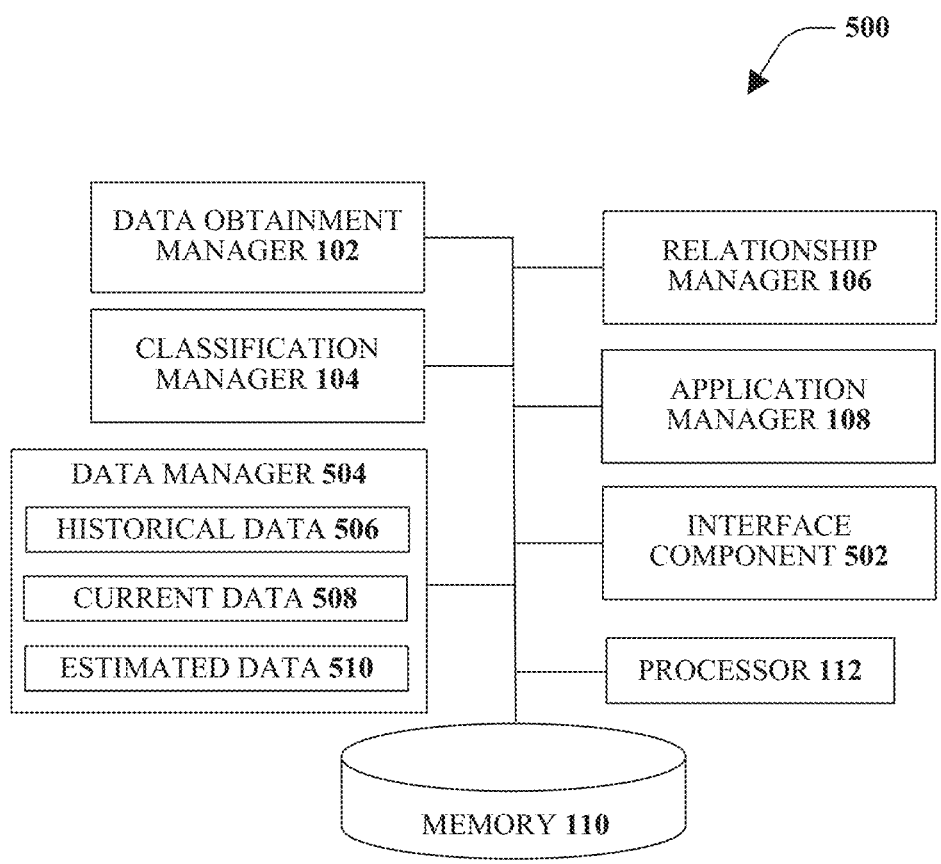
FIG. 5 illustrates an example, non-limiting system that provides cognitive and heuristics-based emergent financial management, according to an aspect.

FIG. 5 illustrates an example, non-limiting system 500 that provides cognitive and heuristics-based emergent financial management, according to an aspect. A customer interacts with the system 500 (or the system 500 receives information from a team member) through an interface component 502. According to some implementations, each user may interact with the system 500 through their user device (e.g., mobile phone, personal computer, and so on). This information may be communicated from the respective user device to the interface component 502 or to another system component.

The customer and the team member (e.g., external agents and internal agents) interact with the system, information flows back and forth and the interrelationship between business capability architecture supports the interaction to drive decisions on how things are done.

Also included in the system 500 may be a data manager 504 that may be configured to manage the received data. For example, the data manager 504 may flagged or otherwise mark to data to indicate whether the data is historical data 506, current data 508, or estimated data 510. The historical data 506 is any data that has been gathered from a user or a set of users over time. The current data 506 relates to a current activity or other data of the user (e.g., location, activity, and so on). The estimated data 510 is a projection of what is likely to occur (e.g., if you wait forty days you will save money).

The following is a use-case scenario, an individual (referred to as Tom) is driving through his neighborhood and sees a house for sale. By interacting with a device (e.g., mobile phone, smart watch, personal computer, and so on), Tom interacts with the system 500 (e.g., through the interface component 502) and asks whether he should buy or rent a house, or whether a particular house for sale would be a good investment. In this example, Tom is interacting with the PASTRY 304 section of FIG. 3.

The location of Tom may be known, such as through a GPS location or other means of determining the location. According to some implementations, the location is known based on information received from a device associated with Tom (e.g., a user device), which may be conveyed to the interface component 502 or another system component.

Further, the data manager 504 already has information about Tom, such as how much money he has saved, how much he can use for a down payment, spending habits, and so on. Further, the data manager 504 has information related to what is happening in the market, what Tom's peers are doing, and so on. Based on the known information, the data manager 504 (e.g. the PASTRY section 304 section of FIG. 3) looks ahead and may provide advice in real-time (e.g., within seconds and while Tom is driving through the neighborhood).

With reference again to FIGS. 4A and 4B, the cake data mine map 400 is an example, non-limiting DNA of the bank. The central components are capability 402, application 404, strategy 406, organization 408, process, 410, product, 412, project 414, partner 416, and customer 418. As illustrated, possible systems of application 404 include "cloud," "remedy," and "Intranet." With reference to Intranet, there are emails, people have further discussions, and how all the data is assimilated or organized in order for the various aspects discussed herein to perform the insightful decision making scenario for the customer (or other agent).

With reference to the customer 308 branch, there is fraud 420, IoT 422, social media 424, and APS 426. Associated with APS 426 are different channel data, which may include online channels, mobile channels, ATMs, stores, phones, and so on (e.g., augmented reality). All of this information is collected (e.g., streaming data, operational data, near realtime data) and processed. This is one of the values of the CAKE data mine map 402. For example, it is easily demonstrable and determined that customer is connected to product, which is connected to organization, which is connected to capability.

Traditional systems organize data based on processes. For example, there may be a business process model where SORs are mapped to a set of processes (e.g., collections, such as collecting money or open accounts). The concept of SORs explains the relationship between a stimulus (S) the customer receives, what emotions the customer feels in their organism (O), and the customer's responses or attitudes (R). The problem with the traditional systems is that those systems are not staple architectures because at any time the process may change. Therefore, a person has to go back to the taxonomy and the mapping in the taxonomy and manually move the lines back and forth to connect the new components and remove the old components as appropriate.

Accordingly, an advantage of the various aspects discussed herein is that the capacity mapping is a highly stable abstraction of the various functions performed. For example, a capability is "sales" and under "sales" is "underwriting," which has a capability that banks (and other entities) perform on a daily basis. Therefore, this does not change, but the process may change. Some are semi-automated, others fully automated, using robots, for example. However, regardless of whether organizations are a mixture of robot and human, the process of underwriting, the tools used (e.g., pen and paper, financial software, and so forth) does not matter because the underlying capability will be what the bank does on a daily basis. Therefore, the lines (in FIGS. 4A and 4B) that connect are capabilities, which seldom change over a period of time.

According to an additional or alternative implementation, another way that data may be organized is from a technology focus. Take for example, an application management lifecycle, which may be in an Information Technology (IT) framework (e.g., an IT infrastructure library). This is looked at in terms of systems development, systems maintenance, help desk, and so on. Thus, all the SORs in the bank and all the systems will fall under any of those technology processes. It is noted that although various use cases of technology have been discussed herein, these use cases do not encompass all possible use cases and/or technologies.

With reference again to FIG. 3, the CAKE portion 306 may be a decision support tool for executives in the bank in terms of the same questions (or different questions) posed by the customers (e.g., should I buy or rent?). In another example, the CAKE portion 306 may be a decision support tool that advises a line of business executive whether they should outsource to an external team or keep the functions internal to the bank.

In another example, the question posed may be, "Do I have the capability to underwrite or should I outsource it?". For the executive to make that decision herself, she needs to have a way of aggregating and making sense out of the data that exists in the bank, and knowing that the different groups may operate in silos within the bank. With traditional systems, this may only be available to the decision makers in the bank. They not only have a point of view as to how the organization is set up today, but what are the key strategic initiatives of the organization and the other lines of business with which a target line of business should be aligned. Other question may be: "How am I compared to other lines of business in this field called outsourcing?" "What will be the impact of different applications for the bank about moving people to work outside the bank?" "What is being done on the customer experience and the capability of a toll-free telephone line if any questions arise if someone outside the bank is answering the phone?" "How about regulations and export of information outside USA?" This questions may be answered today, however, it may take months for a decision and a large number of resources have to be expended.

According to some implementations, the CAKE portion 306 is output as a dashboard. The dashboard may sit on top of (e.g., overlaid on) a shared platform. Therefore, the operational data, strategic data, streaming data, context data, and so on, may be seen at substantially the same time as actionable insights.

An example, non-limiting organization dashboard is illustrated in Page 7 of Appendix A. An illustration of an example, non-limiting project dashboard is illustrated in Page 8 of Appendix A. The right side (although it could be located at another portion) provides the ability to filter the information using drop down menus (or other means of selection). Although certain filters are illustrated, the data may be filtered utilizing other data.

An example, non-limiting OPS sourcing lever dashboard is illustrated in Page 9 of Appendix A. This dashboard represents an aggregation of organization and projects. As illustrated on the right-hand side (or other portion of the screen) filtering mechanisms are provided.

With reference again to FIG. 5, according to some implementations, the interface component 502 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 6:
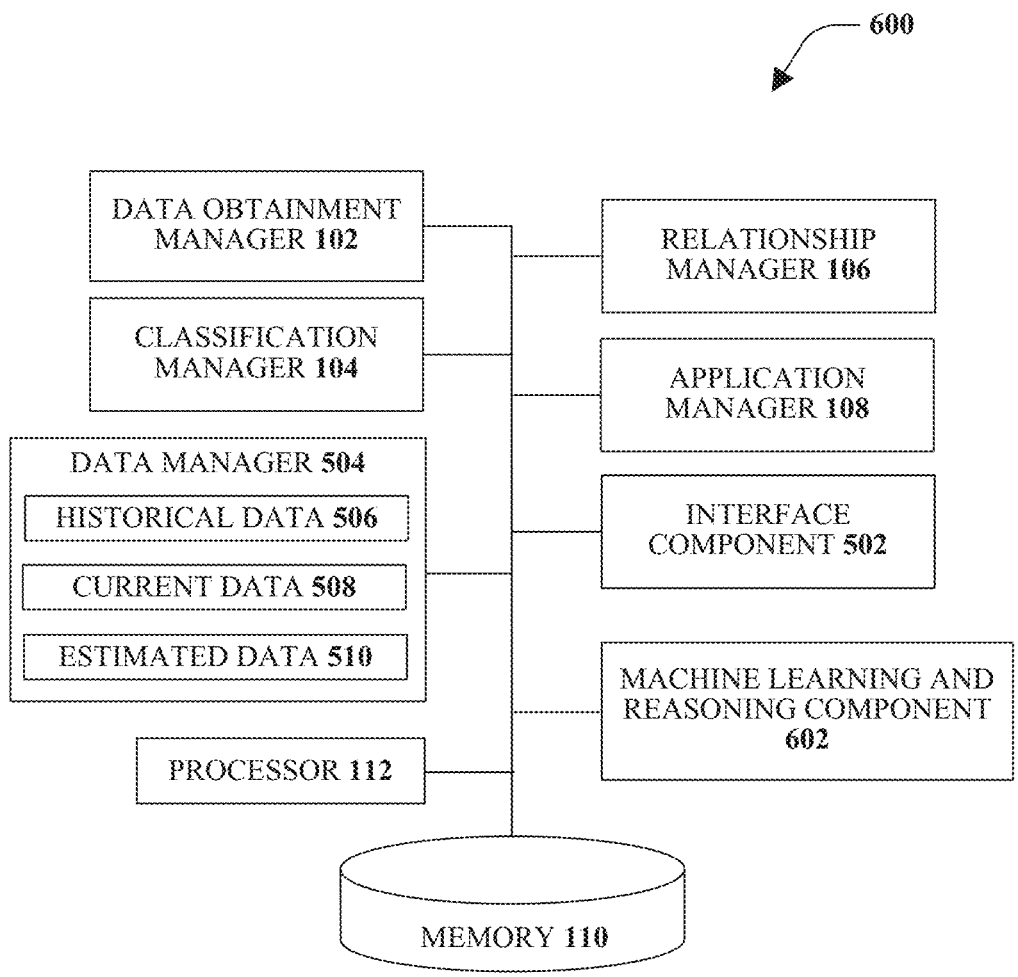
FIG. 6 illustrates an example, non-limiting system that employs automated learning to facilitate one or more of the disclosed aspects.

FIG. 6 illustrates an example, non-limiting system 600 that employs automated learning to facilitate one or more of the disclosed aspects. For example, a machine learning and reasoning component 602 may be utilized to automate one or more of the disclosed aspects. The machine learning and reasoning component 602 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 602 may employ principles of probabilistic and decision theoretic inference. Additionally or alternatively, the machine learning and reasoning component 602 may rely on predictive models constructed using machine learning and/or automated learning procedures. Logic-centric inference may also be employed separately or in conjunction with probabilistic methods.

The machine learning and reasoning component may infer how data should be organized in comparison to other data, which data to utilize to respond to a question, whether a particular set of data should be ranked higher than another set of data to provide a recommended course of action, whether data should be cross-referenced between different organizational categories, and so on. Based on this knowledge, the machine learning and reasoning component 602 may make an inference based on historical data, current data, estimated data and the results of the estimated data (e.g., based on a feedback loop), and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating a collaborative framework or dashboard for addressing issues in real-time) may employ various artificial intelligence-based schemes for carrying out various aspects thereof. For example, a process for determining a priority of a particular set of data, what data should be gathered to analyze certain issues, how to organize one or more sets of data, how to cross-reference sets of data, and so on may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine how data should be organized, which data should be analyzed to respond to an issue, and so on. In the case of cognitive and heuristics-based emergent financial management, for example, attributes may be keywords or phrases in a data set and the classes may be identification of an identified issue.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which response should be given based on historical data related to the same or a similar issue, which data should be output, whether to include one or more sets of data for analysis, whether the predication was correct or not, and so forth. The criteria may include, but is not limited to, similar information, historical information, current information, issue (e.g., question) attributes, and so forth.

Additionally or alternatively, an implementation scheme (e.g., a rule, a policy, and so on) may be applied to control and/or regulate which issue submissions are considered to be routine and most likely has more data that may be analyzed. In some implementations, based upon a predefined criterion, the rules-based implementation may automatically and/or dynamically interpret attributes associated with each issue. In response thereto, the rule-based implementation may automatically interpret and carry out functions associated with the issues by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 7:
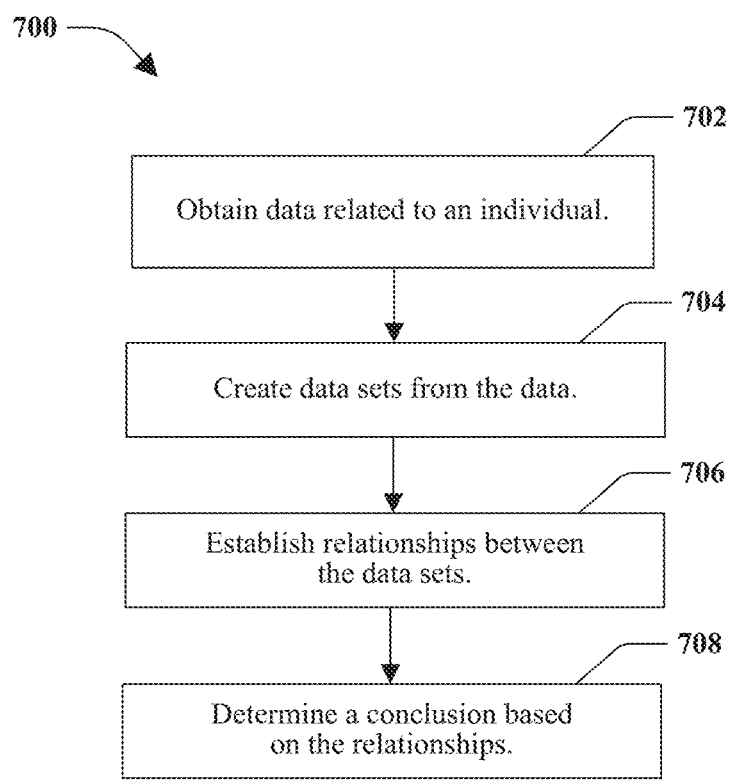
FIG. 7 illustrates an example, non-limiting method for cognitive and heuristics-based emergent financial management, according to an aspect.

FIG. 7 illustrates an example, non-limiting method 700 for cognitive and heuristics-based emergent financial management, according to an aspect. The method 700 in FIG. 7 may be implemented using, for example, any of the systems, such as the system 500 (of FIG. 5), described herein.

The method 700 starts at 702, when data related to an individual (or more than one individual is obtained). Further, data related to an organization and/or processes may be obtained. The data may be obtained from internal sources, external sources, or combinations thereof (both internal and external sources). The data may also be related to a business organization or other individuals (e.g., peers). Further, the data may be in various formats including, for example, a structured format, a semi-structured format, an unstructured format, or combinations thereof.

At 704, data sets are created from the data. The data sets may be created based on determined classifications of the data. For example, the data sets may be categorized based on capabilities. Relationships between data sets are created, at 706. For example, the relationships may be based on determined classifications of the data.

A conclusion based on the relationships is determined, at 708. The conclusion may be provided in response to a question posed (e.g., issue presented). According to some implementations, the conclusion may be based on a hypothesis that has undergone a test process.

Figure 8:
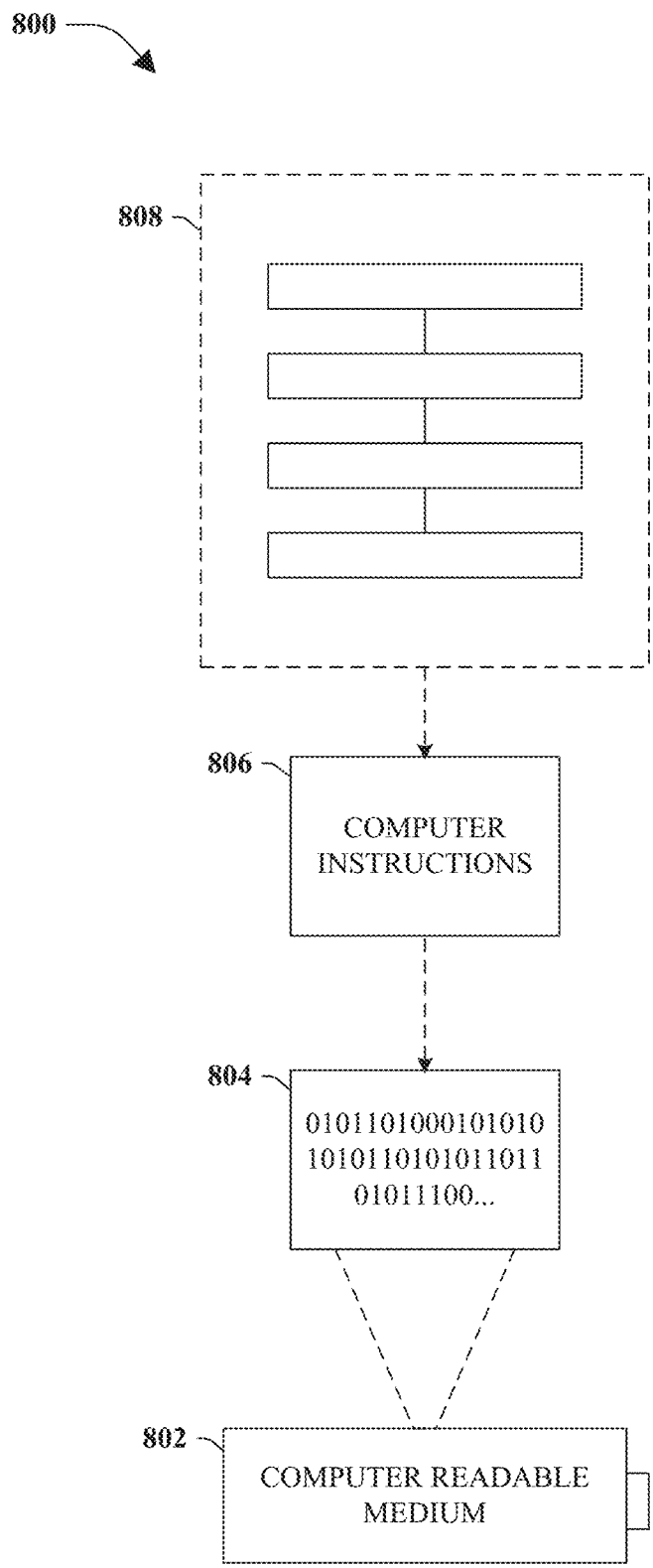
FIG. 8 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable cognitive and heuristics-based emergent financial management. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the set of computer instructions 806 (e.g., processor-executable computer instructions) may be configured to perform a method 808, such as the method 700 of FIG. 7, for example. In another embodiment, the set of computer instructions 806 may be configured to implement a system, such as the system 100 of FIG. 1 and/or the system 600 of FIG. 6, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 9:
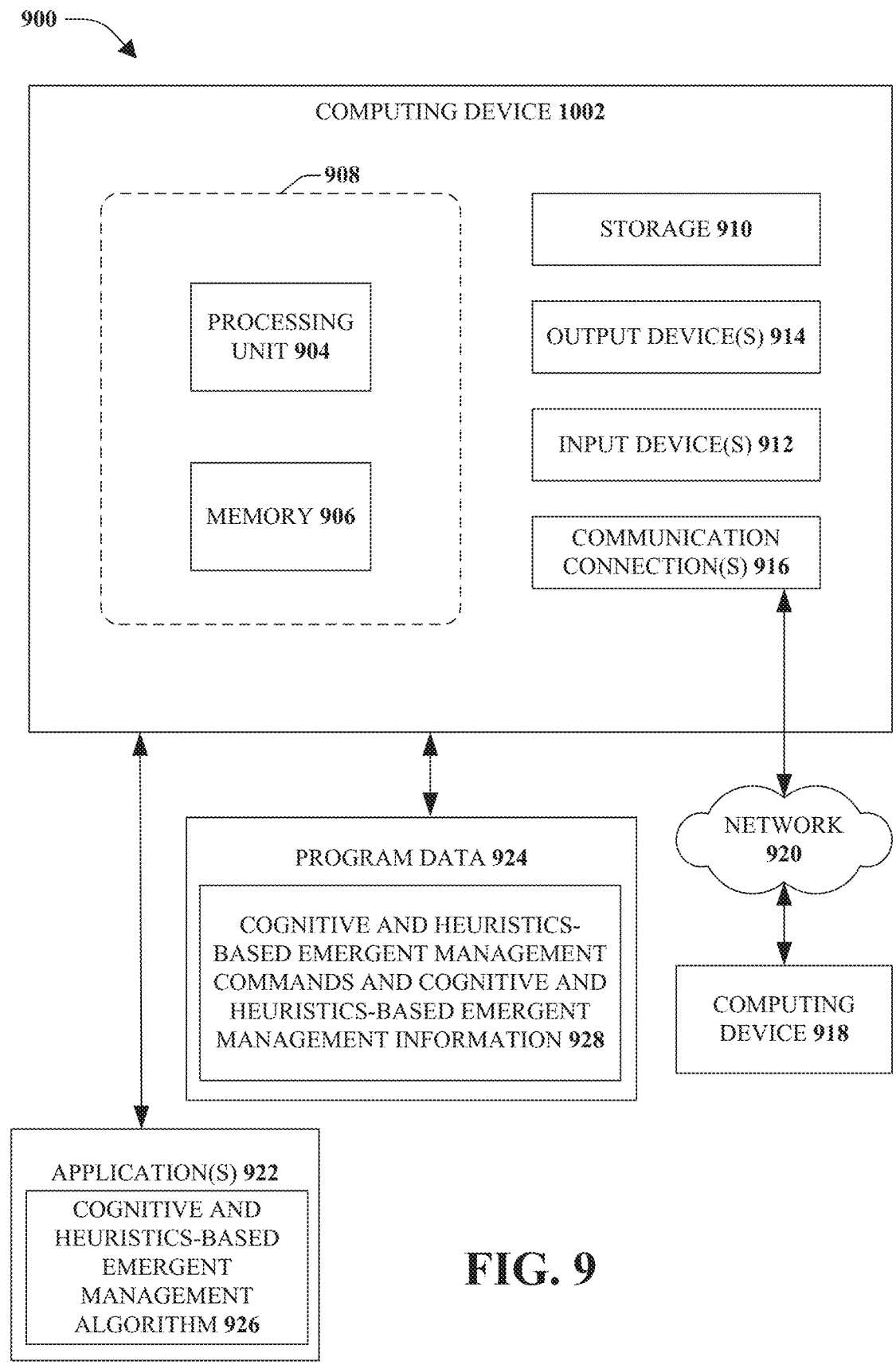
FIG. 9 illustrates an example, non-limiting computing environment where one or more of the aspects set forth herein are implemented, according to one or more aspects.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the computing device 902 may include additional features or functionality. For example, the computing device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the computing device 902. The input device(s) 912 and the output device(s) 914 may be connected to the computing device 902 via a wired connection, wireless connection, or any combination thereof. In one or more embodiments, an input device or an output device from another computing device may be used as the input device(s) 912 and/or the output device(s) 914 for the computing device 902. Further, the computing device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a cognitive and heuristics-based emergent financial management algorithm 926 that is arranged to perform the functions as described herein including those described with respect to the system 300 of FIG. 3. The program data 924 may include cognitive and heuristics-based emergent financial management commands and cognitive and heuristics-based emergent financial management information 928 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor; and
a memory that stores executable instructions that, when executed by the processor, facilitate performance of operations, comprising:

obtaining data related to an individual, an organization, a process, or combinations thereof, wherein the act of obtaining data integrates details of a business capacity architecture including at least two of strategy, organization, capability, process, application, project, partner, product and customer;

creating data sets from the data based on determined classifications of the data, wherein the act of creating data sets and establishing relationships between the data sets is facilitated by a machine learning and reasoning component that employs classifiers comprising explicitly trained classifiers, implicitly trained classifiers or a combination of explicitly and implicitly trained classifiers and that infers how the data should be organized in comparison to other data, relative rankings of the data sets, and whether the data is cross-referenced between different organizational categories; and establishing relationships between the data sets; and determining a conclusion based on the relationships, wherein the conclusion is based on a hypothesis that has undergone a test process.

2. The system of claim 1, wherein the data is in a structured format, a semi-structured format, an unstructured format, or combinations thereof.

3. The system of claim 1, wherein the data is acquired from an internal source.

4. The system of claim 1, wherein the data is acquired from an external source.

5. The system of claim 1, wherein the data is acquired from an internal source and an external source.

6. The system of claim 1, wherein the creating data sets is further based on the business capacity architecture that organizes data based on at least in part on capability of functions related to the obtained data.

7. The system of claim 6, wherein the business capacity architecture is comprised of a cognitive and heuristic based emerging financial management section, a personal asset tracking section and a capability architecture knowledge base for an enterprise section.

8. The system of claim 7, wherein the capability architecture knowledge base for an enterprise section comprises a data organization component that cross-references processes, technology and a stimulus-organism-response mapping.

9. The system of claim 7, wherein the classifiers are employed across the cognitive and heuristic based emerging financial management section, the personal asset tracking section and the capability architecture knowledge base.

10. A method, comprising:

obtaining, by a system comprising a processor, data from internal sources, external sources, or combinations thereof, wherein the act of obtaining data integrates details of a business capacity architecture including at least two of strategy, organization, capability, process, application, project, partner, product and customer;

creating, by the system, data sets from the data based on determined classifications of the data, wherein the act of creating data sets and establishing relationships between the data sets is facilitated by a machine learning and reasoning component that employs classifiers comprising explicitly trained classifiers, implicitly trained classifiers or a combination of explicitly and implicitly trained classifiers that infers how the data should be organized in comparison to other data, relative rankings of the data sets, and whether the data is cross-referenced between different organizational categories;

establishing, by the system, relationships between the data sets; and determining, by the system, a recommendation based on the relationships, wherein the recommendation is based on a hypothesis that has undergone a test process.

11. The method of claim 10, wherein the determining is based in part on a feedback loop that represents previous recommendations.

12. The method of claim 10, wherein the creating data sets is further based on the business capacity architecture that organizes data based on at least in part on capability of functions related to the obtained data.

13. The method of claim 12, wherein the business capacity architecture is comprised of a cognitive and heuristic based emerging financial management section, a personal asset tracking section and a capability architecture knowledge base for an enterprise section.

14. The method of claim 13, wherein the capability architecture knowledge base for an enterprise section comprises a data organization component that cross-references processes, technology and a stimulus-organism-response mapping.

15. The method of claim 13, wherein the classifiers employed are employed across the cognitive and heuristic based emerging financial management section, the personal asset tracking section and the capability architecture knowledge base.

16. A non-transitory computer-readable storage device that stores executable instructions that, in response to execution, cause a system comprising a processor to perform operations, comprising:

obtaining data related to an individual, an organization, a process, or combinations thereof, wherein the act of obtaining data integrates details of a business capacity architecture including at least two of strategy, organization, capability, process, application, project, partner, product and customer;

creating data sets from the data based on determined classifications of the data, wherein the act of creating data sets and establishing relationships between the data sets is facilitated by a machine learning and reasoning component that employs classifiers comprising explicitly trained classifiers, implicitly trained classifiers or a combination of explicitly and implicitly trained classifiers that infers how the data should be organized in comparison to other data, relative rankings of the data sets, and whether the data is cross-referenced between different organizational categories;

establishing relationships between the data sets; and determining a conclusion based on the relationships, wherein the conclusion is based on a hypothesis that has undergone a test process.

17. The non-transitory computer-readable storage device of claim 16 that to perform operations further comprise:

creating data sets is further based on the business capacity architecture that organizes data based on at least in part on capability of functions related to the obtained data.

18. The non-transitory computer-readable storage device of claim 17 that to perform operations further comprise:

establishing relationships between the data sets is based at least in part on cross-referencing processes, technology and a stimulus-organism-response mapping of the capability of functions related to the obtained data.

19. The non-transitory computer-readable storage device of claim 16 that to perform operations further comprise:
wherein the classifiers employed are employed across different sections of the business capacity architecture that is comprised of a cognitive and heuristic based emerging financial management section, a personal asset tracking section and a capability architecture knowledge base for an enterprise section.

* * * * *